No. 783,356. Patented February 21, 1905.

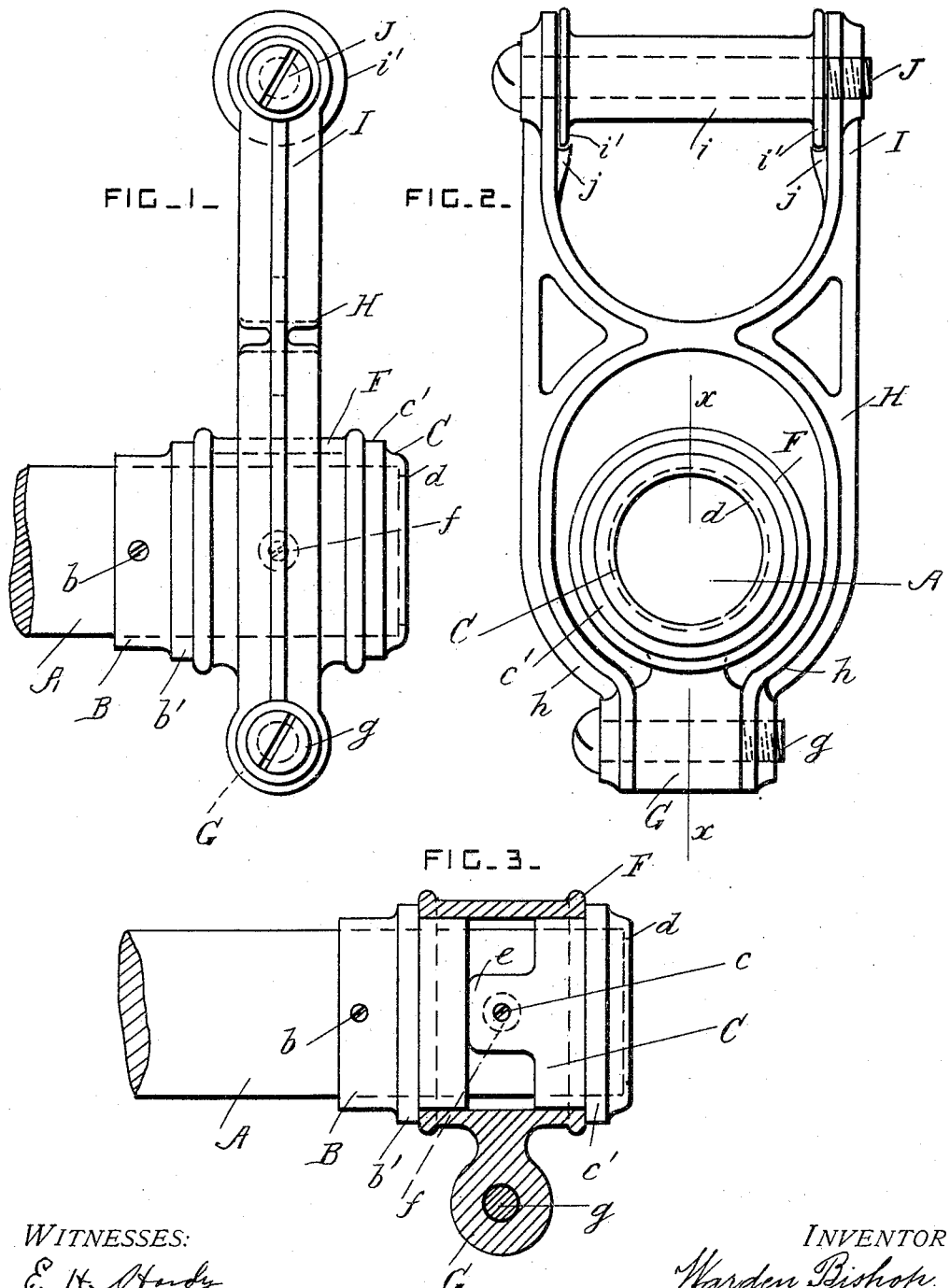

UNITED STATES PATENT OFFICE.

WARDEN BISHOP, OF STERLING, KANSAS, ASSIGNOR OF ONE-HALF TO JOHN B. CULBERTSON, OF STERLING, KANSAS.

CLIP FOR NECK-YOKES.

SPECIFICATION forming part of Letters Patent No. 783,356, dated February 21, 1905.

Application filed August 12, 1904. Serial No. 220,563.

*To all whom it may concern:*

Be it known that I, WARDEN BISHOP, a citizen of the United States, residing at Sterling, in the county of Rice and State of Kansas, have invented certain new and useful Improvements in Clips; and I do hereby declare the following to be a full, clear, and exact description of the invention, such as will enable others skilled in the art to which it appertains to make and use the same.

This invention relates to clips for neck-yokes by means of which the free end portion of the neck-yoke is connected to the breast-strap of the collar of the animal used for drawing a vehicle along; and it consists in the novel construction and combination of the parts hereinafter fully described and claimed.

In the drawings, Figure 1 is a side view of one free end portion of a neck-yoke provided with a clip according to this invention. Fig. 2 is an end view of the same. Fig. 3 is a side view of the end portion of the neck-yoke, showing the collar in section on the line $x\ x$ in Fig. 2.

A is the end portion of a neck-yoke of any approved construction, such as ordinarily used in connection with vehicles.

B is a cylindrical ferrule or bearing, which is secured to the neck-yoke near its end by screws $b$. This bearing is provided with a projecting flange $b'$. C is a second ferrule or bearing, which is secured to the extreme end portion of the neck-yoke by screws $c$. This bearing C is provided with a projecting flange $c'$, similar to the flange $b'$, and it also has an inwardly-projecting flange $d$ at its outer end, which abuts against the end of the neck-yoke. The ferrule or bearing C has also two projecting lugs $e$, which abut against the bearing B and prevent the two bearings from being secured too close together. The holes for the fastening-screws $c$ are placed in these lugs $e$ so that they come midway between the flanges $b'$ and $c'$.

F is a collar which is journaled on the bearings B and C and provided with holes $f$ at its middle part, so that access may be had to the screws $c$, which have to be inserted after the parts have been placed in position on the end portion of the neck-yoke.

G is a lug which projects at one side of the collar F.

H is a frame which is pivoted to the lug G by a screw $g$. This frame straddles the end portion of the neck-yoke and has curved portions $h$ at the end of it which is pivoted to the lug. The frame has a forked end portion I at its other end, and $i$ is a roller provided with flanges $i'$ at its ends, which is journaled on a screw J in the forked end portion I of the frame. The forked end portion I has projections $j$ on its sides, which partially overlap the flanges of the roller and prevent anything from getting between them and the frame. The breast-strap of the collar engages with the roller, and the breast-strap is not worn away by the roller, as it is when a ring is provided for it to engage with, as in the ordinary manner.

What I claim is—

1. The combination, with a neck-yoke, of bearings secured to one end portion of the said neck-yoke, a collar journaled on the said bearings and prevented by them from sliding longitudinally, a frame which straddles the said collar and which is pivoted at one end to it, and a roller journaled at the other end of the said frame.

2. The combination, with a neck-yoke, of two bearings secured to the end portion of the said neck-yoke and provided with projecting flanges, a collar provided with a projecting lug and journaled on the said bearings, a frame which straddles the said collar and which is pivoted to the said lug, and a roller journaled in the free end portion of the said frame.

3. The combination, with a neck-yoke of two bearings secured to the end portion of the said neck-yoke, the outer of the said bearings being provided with perforated lugs for its fastening-screws which project from its end toward the other said bearing, and each bearing being provided with a projecting flange, a collar provided with a projecting lug and journaled on the said bearings between their said flanges and provided also with a hole at its middle part for giving access to the said fastening-screws, a frame which straddles the said collar and which is pivoted to the said lug, and a roller journaled in the free end portion of the said frame.

In testimony whereof I have affixed my signature in the presence of two witnesses.

WARDEN BISHOP.

Witnesses:
G. J. BROWN,
J. E. BELDEN.